United States Patent
Taha et al.

(10) Patent No.: US 12,098,340 B1
(45) Date of Patent: Sep. 24, 2024

(54) MICROWAVE ASSISTED SYNTHESIS OF GREENLY SYNTHESIZED MAGNETIC HYDROCHAR NANOCOMPOSITE OBTAINED FROM DESERT DATE SEEDS

(71) Applicant: KING FAISAL UNIVERSITY, Al-Ahsa (SA)

(72) Inventors: Amel Musa Babiker Taha, Al-Ahsa (SA); Samah Babiker Daffalla Balal, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/435,659

(22) Filed: Feb. 7, 2024

(51) Int. Cl.
*C10L 5/00* (2006.01)
*C10L 5/44* (2006.01)
*H01F 1/42* (2006.01)

(52) U.S. Cl.
CPC ............... *C10L 5/447* (2013.01); *H01F 1/42* (2013.01)

(58) Field of Classification Search
CPC .................................. C10L 5/447; H01F 1/42
See application file for complete search history.

(56) References Cited

FOREIGN PATENT DOCUMENTS

| BR | 102018068130 | A2 | | 3/2020 | |
|---|---|---|---|---|---|
| CN | 103316636 | B | | 11/2016 | |
| CN | 113061453 | A | * | 7/2021 | ............. C10G 1/002 |
| WO | WO-2023184033 | A1 | * | 10/2023 | |

OTHER PUBLICATIONS

CN-113061453-A English translation (2021).*
Faiçal El Ouadrhiri, Majda Elyemni, Amal Lahkimi,, Abdelhadi Lhassani, Mehdi Chaouch, and Mustapha Taleb "Mesoporous Carbon from Optimized Date Stone Hydrochar by Catalytic Hydrothermal Carbonization Using Response Surface Methodology: Application to Dyes Adsorption", DOI: https://doi.org/10.1155/2021/5555406.
Alshimaa E. Nassar, Eslam Ibrahim El-Aswar, Sameh A. Rizk, Seleem El-Sayed Gaber, and Hossam S. Jahin, "Microwave-assisted hydrothermal preparation of magnetic hydrochar for the removal of organophosphorus insecticides from aqueous solutions", DOI: https://doi.org/10.1016/j.seppur.2022.122569.
Amira Alazmi, Sabina A. Nicolae, Pierpaolo Modugno, Bashir E. Hasanov, Maria M. Titirici and Pedro M. F. J. Costa, "Activated Carbon from Palm Date Seeds for CO2 Capture." DOI: https://doi.org/10.3390/ijerph182212142.
Jari S. Algethami, Mohsen A.M. Alhamami, Ayoub Abdullah Alqadami, Saad Melhi, Amal F. Seliem, "Adsorptive performance of a new magnetic hydrochar nanocomposite for highly efficient removal of cadmium ions from water: Mechanism, modeling, and reusability studies". DOI: https://doi.org/10.1016/j.eti.2023.103404.

* cited by examiner

*Primary Examiner* — Ellen M McAvoy
*Assistant Examiner* — Chantel Graham
(74) *Attorney, Agent, or Firm* — Nath, Goldberg & Meyer; Joshua B. Goldberg

(57) ABSTRACT

A method for forming a magnetic hydrochar nanocomposite includes the step of adding basically treated desert date seeds into a vessel containing phosphoric acid and mixing the basically treated desert date seeds with the phosphoric acid to form a mixture. The mixture is transferred to a microwave and heated to 150° C. The mixture is held at this temperature for one hour to form a hydrochar. The magnetic hydrochar nanocomposite is further formed by dissolving ferrous sulphate and ferric chloride to form magnetic nanoparticles. The magnetic nanoparticles are mixed with the hydrochar, then date fruit extract is mixed with the magnetic nanoparticles and hydrochar mixture to form a resultant mixture. The pH of the resultant mixture is raised to 9-11 by adding sodium hydroxide to form a basic resultant mixture. The basic resultant mixture is heated in a microwave to 150° C. for 30 minutes to form the magnetic hydrochar nanocomposite.

5 Claims, No Drawings

MICROWAVE ASSISTED SYNTHESIS OF GREENLY SYNTHESIZED MAGNETIC HYDROCHAR NANOCOMPOSITE OBTAINED FROM DESERT DATE SEEDS

BACKGROUND

1. Field

The present disclosure relates to the synthesis of magnetic hydrochar nanocomposites, in particular the present disclosure relates to magnetic hydrochar nanocomposites obtained from desert date seeds.

2. Description of the Related Art

Desert date (*Balanite aegyptiaca* Linn.) is an important multipurpose tree found in most African countries. Desert date has multiple applications with almost every part of the plant being useful, but the tree is valued more for its fruits and seeds. The fruit and kernel are widely used in many ways. In different countries, the fruit and kernel of the desert date is traditionally used in the treatment of various ailments such as jaundice, intestinal worm infection, malaria, syphilis, epilepsy, dysentery, constipation, and hemorrhoid, among others. The fruits are processed into beverages and liquor. Gum or resin produced from stems are used as glue. Seeds contain about 49% edible oil, which is also used in the production of biodiesel fuel.

In another related field of endeavor, transformation of biomass is becoming of great importance nowadays since it is a way for recycling or reusing materials including agricultural waste and livestock and converting the biomass into more functional products. Thermochemical conversion of biomass (pyrolysis, gasification, or hydrothermal carbonization) into hydrochars or biochars is an efficient approach where the biomass is treated at different conditions of temperature, pressure, residence time, biomass to water ratio, and pH of the substrate that leads to materials with particular physicochemical properties.

Hydrochars seem to appear as prospective materials that can be employed in numerous fields, some of which are nanoelectronics, catalysis, optics, biosensors, environmental remediation, energy, hydrogen storage, drug transport, magnetic resonance imaging, and cancer diagnosis.

Accordingly, there remains a need for obtaining additional sources of creating hydrochars by a green process.

SUMMARY

There is a need for novel hydrochars made by green processes. The present disclosure is drawn to a hydrochar made from desert date seeds. The hydrochar is prepared through a microwave-assisted hydrothermal carbonization of the prepared desert date seeds.

In particular, the present subject matter synthesizes a magnetic hydrochar nanocomposite (MAHC) from desert date seeds, which has not been done before. The present process is environmentally friendly and low-cost, green, non-toxic, and non-carcinogenic. The produced MAHC can be employed in numerous fields, some of which are nanoelectronics, catalysis, optics, biosensors, environmental remediation, energy, hydrogen storage, drug transport, magnetic resonance imaging, and cancer diagnosis. For this reason, it is essential that this biomass waste material is utilized effectively.

In an embodiment, the present disclosure is directed to a process of preparing magnetic hydrochar nanocomposites. The process includes the steps of adding basically treated desert date seeds into a vessel containing phosphoric acid and mixing the basically treated desert date seeds with the phosphoric acid to form a mixture; transferring the mixture to a microwave and heating the mixture to about 150° C. at a rate of about 10° C./minute; holding the temperature at about 150° C. for one hour to form a hydrochar; dissolving ferrous sulphate and ferric chloride in an about 1:2 weight ratio in deionized water to form magnetic nanoparticles; mixing the magnetic nanoparticles with the hydrochar to obtain a magnetic nanoparticles and hydrochar mixture; mixing date fruit extract with the magnetic nanoparticles and hydrochar mixture to form a resultant mixture; raising a pH of the resultant mixture to about 9 to about 11 by adding about 1M sodium hydroxide to form a basic resultant mixture; and heating the basic resultant mixture in a microwave to about 150° C. for about 30 minutes to form the magnetic hydrochar nanocomposite.

In a particular embodiment, the magnetic hydrochar is further purified by washing with distilled water, applying an external magnetic field, and drying at about 40° C.

In a further embodiment, the basically treated desert date seeds are formed by a method comprising the steps of: harvesting desert date seeds; washing the harvested desert date seeds to form washed desert date seeds; drying the washed desert date seeds at about 40° C. to form dried desert date seeds; crushing the dried desert date seeds to form crushed desert date seeds; passing the crushed desert date seeds through a sieve to obtain homogeneous desert date seeds; and mixing the homogeneous desert date seeds with 0.1 M potassium hydroxide and heating at about 70° C. for about three hours to form the basically treated desert date seeds.

The present subject matter is also directed to the magnetic hydrochar nanocomposites formed by the methods described herein.

DETAILED DESCRIPTION OF THE PREFERRED EMBODIMENTS

Throughout the present disclosure, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise. The use of the terms "include," "includes", "including," "have," "has," or "having" should be generally understood as open-ended and non-limiting unless specifically stated otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present disclosure is directed to a process for preparing a magnetic hydrochar nanocomposite obtained from desert date seeds (DDS). In general, hydrochar is attractive because of its notable properties as an environmentally friendly and cost-effective adsorbent for the removal of pollutants from the aqueous phase. In other words, hydrochar enhances the removal of water pollutants via adsorption.

In using hydrochar to remove pollutants from wastewater, magnetic hydrochar is able to solve some of the challenges regarding ease of collecting the adsorbents after the adsorption process is completed. In the present disclosure, the magnetic precursor is added to the hydrochar during the hydrochar synthesis. Adding the magnetic precursor during the hydrochar synthesis ensures that the magnetic material is not only on the hydrochar surface but is also well-dispersed throughout the hydrochar.

Thus, the present disclosure is directed to the synthesis of magnetic hydrochar by using a low-cost agricultural waste in the form of DDS and using the DDS fruit extraction as a reducing agent to form the nanocomposite.

Hydrothermal Carbonization (HTC) for producing hydrochar is an effective technically-attractive thermochemical exothermic process that converts biomass into rich carbonaceous materials. Commonly, HTC operates at relatively low temperatures ($\approx$100-300° C.) compared to pyrolysis and autogenous pressure, which are other techniques for forming hydrochar but which operate at much higher temperatures (500-800° C.). In relatively recent developments for forming hydrochar, a microwave is used as a heating source instead of normal heating sources, and this treatment is called the microwave-assisted hydrothermal carbonization (MHC) method. The microwave-assisted hydrothermal carbonization method offers several advantages as it is a greener method and saves time and energy. In the MHC method of the present disclosure, the microwave can selectively heat more polar parts of the DDS in the feedstock, thus forming "hot spots" and increasing the disruption of the DDS in the biomass. In other words, the microwave-assisted hydrothermal treatment is a heating method for converting moisture-laden biomass at relatively mild reaction temperatures into hydrochar.

The present disclosure specifically uses microwave heating within the process. Microwave heating has various advantages over conventional heating sources. For example, microwave energy is delivered directly to the material through molecular interaction with the electromagnetic field. Since microwaves can penetrate the material and supply energy, heat can be generated throughout the volume of the material resulting in volumetric heating. Besides volumetric heating, microwave heating offers several other advantages such as: (1) selective material heating; (2) rapid heating; (3) non-contact heating; (4) quick start-up and stopping; (5) the ability to treat waste in-situ; and (6) portability of equipment and processes.

In an embodiment of the present subject matter, a method for forming a magnetic hydrochar nanocomposite includes the step of adding basically treated desert date seeds into a vessel containing phosphoric acid and mixing the basically treated desert date seeds with the phosphoric acid (about 50% by weight) to form a mixture. The mixture is transferred to a microwave and heated to about 150° C. at a rate of about 10° C./minute. The mixture is held at the temperature of about 150° C. for about one hour to form a hydrochar.

The magnetic hydrochar nanocomposite is further formed by dissolving ferrous sulphate and ferric chloride in an about 1:2 weight ratio in deionized water to form magnetic nanoparticles. The magnetic nanoparticles are mixed with the hydrochar, then date fruit extract is mixed with the magnetic nanoparticles and hydrochar mixture to form a resultant mixture. The pH of the resultant mixture is raised to about 9 to about 11 by adding 1M sodium hydroxide to form a basic resultant mixture. The basic resultant mixture is transferred to a microwave and heated to about 150° C. for about 30 minutes to form the magnetic hydrochar nanocomposite.

In an embodiment, the magnetic hydrochar is further purified by washing with distilled water, applying an external magnetic field, and drying at about 40° C.

In a particular embodiment, the basically treated desert date seeds are formed by a method including harvesting the desert date seeds. The harvested desert date seeds are washed in tap water and distilled water to form washed desert date seeds. The washed desert date seeds are dried to form dried desert date seeds. The washed date seeds can be dried at about 40° C. to form the dried desert date seeds. The dried desert date seeds are crushed to form crushed desert date seeds. The crushing of the dried date seeds can be accomplished using a blender. The crushed desert date seeds are passed through a sieve (50 mesh) to obtain homogeneous desert date seeds. The homogeneous desert date seeds are mixed with 0.1 M potassium hydroxide and heated at about 70° C. for about three hours to form the basically treated desert date seeds.

The following is a non-limiting example of the formation of magnetic hydrochar nanocomposites in accordance with the principles of the present subject matter.

Example 1

Preparation of Basically Prepared Desert Date Seeds (D.D.S.)

Desert date seeds were washed up with tap water and distilled water to remove dust and dirt to form washed D.D.S. After washing, the D.D.S. were dried in an oven at 40° C. to form D.D.S. The dried D.D.S were crushed using a blender and sieved by a 50 mesh Sigma Aldrich to get homogeneous pore size and form homogeneous D.D.S. For the basic treatment, 0.1 M KOH was applied to remove any waxy residual. Typically, 50 g of homogeneous desert date seeds were mixed with 1 L of 0.1 M KOH and heated for 3 hours at 70° C. to form the basically prepared desert date seeds.

Synthesis of Hydrochar (HC)

In a first step, an amount of D.D.S (5 g) was added into a flask containing 50 mL of the activating agent phosphoric acid ($H_3PO_4$) 50%. The mixture was kept under stirring for 5 minutes. The resultant mixture was transferred into a microwave in Teflon® vessels and heated to 150° C. at a rate of 10° C./minute. The mixture was maintained at that temperature for 1 hour. And mixture was then allowed to cool down to room temperature (RT) and this sample is called the hydrochar. After cooling down, the hydrochar was washed and rinsed under vacuum filtration until pH 6 and subsequently dried at 40° C.

Preparation of Date Fruit Extract

Desert date seeds were obtained. The desert date seeds were washed several times using distilled water to remove any dust, rinsed and air-dried at room temperature. 20 g of desert date seeds was taken and boiled in 200 ml deionized water at 100° C. for 15 min using a ceramic hot plate. The extract was left overnight and then filtered using Whatman filter paper. Subsequently 10 mL of desert date fruit extract was used in the preparation of the magnetic hydrochar as described below.

Preparation of Magnetic Hydrochar (MAHC)

The synthesis of magnetic hydrochar was conducted by in situ co-precipitation of magnetite nanoparticles. 3.75 g of Ferrous Sulphate ($FeSO_4 \cdot 7H_2O$) and 7.29 g of Ferric Chloride ($FeCl_3 \cdot 6H_2O$)(1:2 mole ratio) was dissolved in 100 mL of deionized water and the solution mixture was mixed with 0.5 g of hydrochar, stirred and heated at 80° C. 10 mL of desert date fruit extract was added, and the mixture was stirred thoroughly for 5 min. Then, 1 M freshly prepared Sodium Hydroxide (NaOH) was gradually added until the pH was 9-11. This mixture was transferred into microwave vessels and heated to 150° C. for 30 minutes. Finally, the black solid (MAHC) was purified by washing with distilled water to get rid of the impurities by using an external magnetic field and dried at 40° C.

The magnetic hydrochar nanocomposite formed by the microwave-assisted synthesis of the present subject matter can be used in any number of commercial applications, including the removal of pollutants from waste water. In particular, the magnetic hydrochar composite can be used as an adsorbant material for the remediation of polluted water systems. This attractiveness is due mainly to the simplicity, high efficiency, low cost, low maintenance requirements, and convenience of the magnetic hydrochar nanocomposites being utilized as the adsorbants in the commercial processes.

It is to be understood that the present subject matter is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for forming a magnetic hydrochar nanocomposite comprising:
    adding basically treated desert date seeds into a vessel containing phosphoric acid and mixing the basically treated desert date seeds with the phosphoric acid to form a mixture;
    transferring the mixture to a microwave and heating the mixture to about 150° C. at a rate of about 10° C./minute;
    holding the temperature of the mixture at about 150° C. for about one hour to form a hydrochar;
    dissolving ferrous sulphate and ferric chloride in an about 1:2 weight ratio in deionized water to form magnetic nanoparticles;
    mixing the magnetic nanoparticles with the hydrochar to form a magnetic nanoparticles and hydrochar mixture;
    mixing date fruit extract with the magnetic nanoparticles and hydrochar mixture to form a resultant mixture;
    raising a pH of the resultant mixture to about 9 to about 11 by adding 1M sodium hydroxide to form a basic resultant mixture; and
    heating the basic resultant mixture in a microwave to about 150° C. for about 30 minutes to form the magnetic hydrochar nanocomposite.

2. The method of forming the magnetic hydrochar nanocomposite according to claim 1, wherein the magnetic hydrochar is further purified by washing with distilled water, applying an external magnetic field, and drying at about 40° C.

3. The method of forming the magnetic hydrochar nanocomposite according to claim 1, wherein the basically treated desert date seeds are formed by a method comprising the steps of:
    harvesting the desert date seeds;
    washing the harvested desert date seeds to form washed desert date seeds;
    drying the washed desert date seeds at about 40° C. to form dried desert date seeds;
    crushing the dried desert date seeds to form crushed desert date seeds;

passing the crushed desert date seeds through a sieve to obtain homogeneous desert date seeds;

mixing the homogeneous desert date seeds with 0.1 M potassium hydroxide and heating at about 70° C. for about three hours to form the basically treated desert date seeds.

4. The method of forming the magnetic hydrochar nanocomposite according to claim 1, wherein the phosphoric acid is about 50% by weight phosphoric acid.

5. A magnetic hydrochar nanocomposite formed by the method according to claim 1.

* * * * *